US008824998B2

(12) United States Patent
Balthasar et al.

(10) Patent No.: US 8,824,998 B2
(45) Date of Patent: Sep. 2, 2014

(54) MECHANISM FOR FACILITATING DYNAMICALLY PRIORITIZED CONTROL OF CALLS OVER A NETWORK

(71) Applicants: Eddie Balthasar, Folsom, CA (US); Richard T. Beckwith, Portland, OR (US); Cornelius V. Vick, Sacramento, CA (US)

(72) Inventors: Eddie Balthasar, Folsom, CA (US); Richard T. Beckwith, Portland, OR (US); Cornelius V. Vick, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/630,772

(22) Filed: Sep. 28, 2012

(65) Prior Publication Data

US 2014/0094134 A1  Apr. 3, 2014

(51) Int. Cl.
*H04M 11/04* (2006.01)
(52) U.S. Cl.
USPC ...................................................... 455/404.1
(58) Field of Classification Search
CPC ..... H04W 4/22; H04W 76/007; H04W 64/00; H04W 8/18; H04W 74/0875
USPC ........ 379/37, 45, 70, 210.01, 211.02, 215.01, 379/265.02, 266.01, 266.03, 26, 6.04, 379/266.06; 455/404.1, 407, 408, 418, 424, 455/425, 404.2, 414.1, 415, 456.1, 456.3, 455/521; 370/412
See application file for complete search history.

(56) References Cited

U.S. PATENT DOCUMENTS

2002/0106059 A1* 8/2002 Kroll et al. ....................... 379/45
2008/0037763 A1* 2/2008 Shaffer et al. ............. 379/266.01

* cited by examiner

*Primary Examiner* — Dinh P Nguyen
(74) *Attorney, Agent, or Firm* — Blakely, Sokoloff, Taylor & Zafman LLP

(57) ABSTRACT

A mechanism is described for facilitating dynamically prioritized control of calls over a network according to one embodiment. A method of embodiments includes receiving, at a computing device, a call reporting an emergency, automatically evaluating the received call and the reported emergency, and assigning a priority level to the call based on the evaluation of the call and the emergency. The method may further include placing the call in a first queue based on the assigned priority level. The call may be picked from the first queue and processed based on the assigned priority level. Other embodiments are described and claimed.

11 Claims, 5 Drawing Sheets

| Date/Time | ID | Type | % Risk | Call Detail | Name | Address |
|---|---|---|---|---|---|---|
| 05/01/2012 13:10:37 | 117 | ✚ | 99% | <No CALLER RESPONSE> | Joan Martin | Apt 809, 12 Hudson St. Springfield OH |
| 05/01/2012 13:00:37 | 112 | 🔥 | 98% | Smoke in house, flames everywhere, Other homes have smoke | Earl James | 1923 Hall St Springfield, OH |
| 05/01/2012 13:23:37 | 119 | POLICE | 50% | Need police, Alarm keeps turning on, don't hear anything, but. | D Wade | 850 Trask St. Springfield, OH |

FIG. 2B

ID
MECHANISM FOR FACILITATING DYNAMICALLY PRIORITIZED CONTROL OF CALLS OVER A NETWORK

FIELD

Embodiments, as described herein, relate to calling systems. More particularly, embodiments relate to a mechanism for facilitating dynamically prioritized control of calls over a network.

BACKGROUND

With the increase in population, cost reductions and other relevant factors, call volumes to emergency response services (e.g., 911 emergency) by operators continue to increase. However, conventional call centers are ill-equipped and becoming increasingly incapable of handling the high call volume load; for example, conventional call centers employ a large number of telephone operators to simply handle the incoming calls on a First In, First Out (FIFO) basis.

BRIEF DESCRIPTION OF THE DRAWINGS

Embodiments, as described herein, are illustrated by way of example, and not by way of limitation, in the figures of the accompanying drawings in which like reference numerals refer to similar elements.

FIG. 2B illustrates a call log listing and prioritizing a number of received and evaluated calls according to one embodiment.

DETAILED DESCRIPTION

Figure 1:
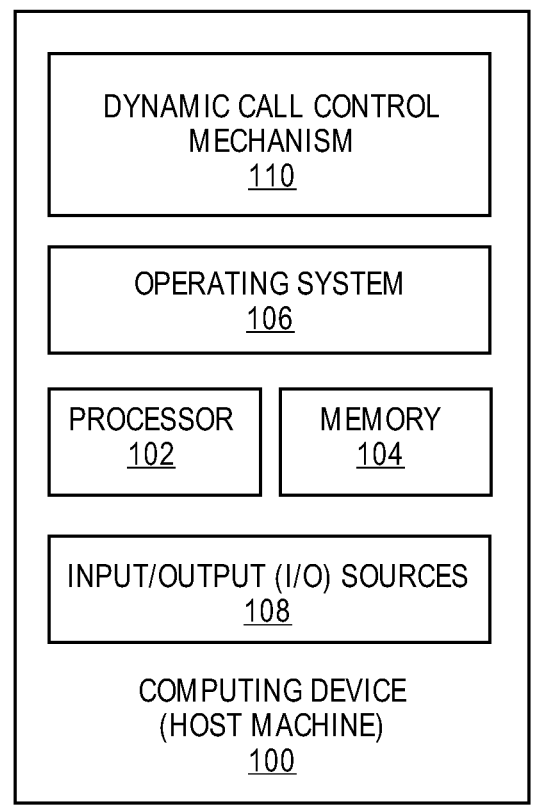
FIG. 1 illustrates a mechanism for dynamically prioritizing call control employed at a computing device according to one embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments are provided for facilitating dynamic, automated, and prioritized triage and efficient handling of calls, such as emergency calls. Conventional call centers are FIFO-based and greatly lack in technology and automation to triage and prioritize the incoming calls in an efficient manner. In one embodiment, a mechanism is provided for facilitating call control automated triage service to utilize a variety of factors, such as, but limited to, voice recognition, location-based services, online mapping service, and caller subscriber information, etc., to ensure triage and prioritized emergency services that are handled by on-call operators.

For example and in one embodiment, information may be captured while a caller is still in the queue in order to identify the type of emergency (e.g., police emergency, fire emergency, medical emergency, etc.), the location of the caller and/or emergency, the nature of the call using prioritization processes, etc. For example, dialogue from the caller may be documented electronically, such as through recognition and use of keywords, phrases, etc., and such information may be brought up on a monitor so that the operators may view and analyze it accordingly. Such techniques are used to facilitate the automated triage of caller calls by using a number of factors and providing various capabilities, such as (1) based on the questions asked of the caller and using the caller's voice response, the type of call and its rating (e.g., value, number) based on data correlation as to the risk level of the call may established. For example, phrases like "not breathing", "turning blue", "stranger in my house", "someone with a gun", etc., could mean a high risk situation; and (2) correlation of multiple calls may be performed, such as using location information and mapping services, any number of calls may be correlated and regarded as related to the same emergency (e.g., neighborhood fire, bank robbery, etc.). Further, for example, a special message or question may be generated to communicate with any subsequent calls, such as "a fire has been reported at 1222 main street, is this call regarding that same fire?" and his way, if the caller answers "yes", time and telephone lines may be saved by having them hang-up the call or be put on hold to receive further instructions from an operator, etc.

Further, (3) the information provided by the caller and captured through subscriber and/or location services may be published as part of an emergency response system (ERS) call and made available to various operators for analysis and processing and may be quickly transferred to an emergency dispatch process; (4) voice messages may be created and broadcasted to any number of callers that fit a certain criteria (e.g., residing in a particular neighborhood where the fire is reported) as a method of communicating information that may pertinent to those callers; and (5) translation services, such as the caller dialogue may be automatically translated from one language to another while maintaining both sets of content (e.g., from Spanish to English and saving both versions).

FIG. 1 illustrates a mechanism for dynamically prioritizing call control 110 employed at a computing device 100 according to one embodiment. Computing device 100 serves as a host machine to employ mechanism for dynamically prioritizing call control ("call control mechanism") 110 to facilitate dynamic, automated and prioritized call control to triage and efficiently handle calls, such as emergency calls (e.g., 911 calls). Computing device 100 may include mobile computing devices, such as cellular phones including smartphones (e.g., iPhone® by Apple®, BlackBerry® by Research in Motion®, Galaxy 3® by Samsung®, etc.), other phones (e.g., landlines), handheld computing devices, personal digital assistants (PDAs), etc., tablet computers (e.g., iPad® by Apple®, Galaxy Tab® by Samsung®, etc.), laptop computers (e.g., notebook, netbook, Ultrabook™, etc.), e-readers (e.g., Kindle® by Amazon®, Nook® by Barnes and Nobles®, etc.), etc. Computing device 100 may further include set-top boxes (e.g., Internet-based cable television set-top boxes, etc.), and larger computing devices, such as desktop computers, server computers, etc.

Computing device 100 includes an operating system (OS) 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "computing device", "node", "computing node", "client", "host", "server", "memory server", "machine", "device", "computing device", "computer", "computing system", and the like, may be used interchangeably throughout this document.

Figure 2A:
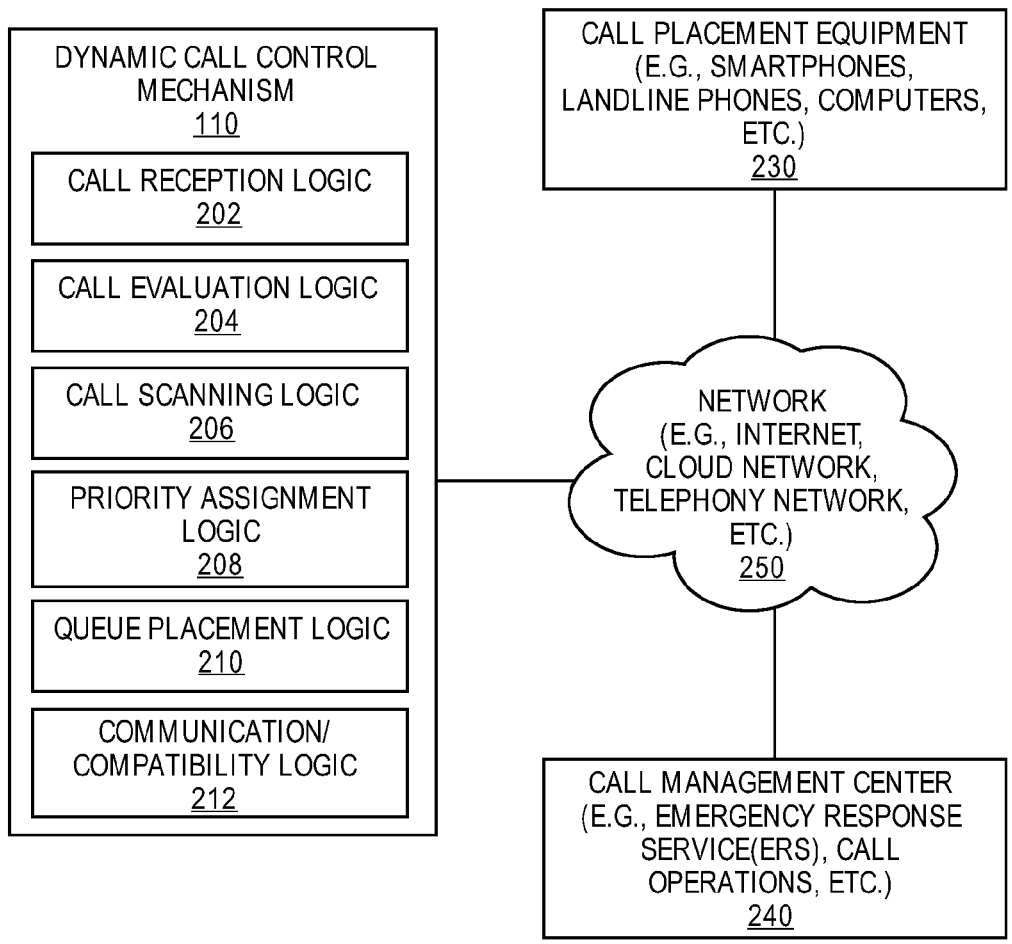
FIG. 2A illustrates a mechanism for dynamically prioritizing call control according to one embodiment.

FIG. 2A illustrates a mechanism for dynamically prioritizing call control 110 according to one embodiment. In one embodiment, call control mechanism 110 may include a number of components, such as call reception logic 202, call evaluation logic 204, call scanning logic 206, priority assignment logic 208, queue placement logic 210, and communication/compatibility logic 212. In one embodiment, call control mechanism 110 may be server-based, such as employed at a server computer (similar to or the same as computing device 100 of FIG. 1) and may be in communication with any number and type of call placement equipment (such as telephones (e.g., smartphones, landline phones, etc.), computing devices (e.g., tablet computers, laptop computers, desktop computers, etc.) via communication services (e.g., Skype®, Tango®, Google Talk®, etc.), and the like) and/or a call management center 240 over a network (e.g., telephone network, cloud network, the Internet, mobile network (e.g., $3^{rd}$ Generation (3G)), etc.). Throughout this document, the term "logic" may be interchangeably referred to as "component" or "module" and may include, by way of example, software, hardware, and/or any combination of software and hardware, such as firmware.

When a call is placed, via a call placement equipment 230, by an end-user (e.g., caller facing or witnessing or anticipating an emergency, etc.), the call is received at call reception logic 202 of call control mechanism 110. Once the call is received, in one embodiment, it is then evaluated by call evaluation logic 204 by having call evaluation logic 204 perform any number and types of tasks to obtain data relating to the caller and/or the call so the call may be put into a queue and prioritized, accordingly. For example, certain information about the call, such as the location of the caller and/or the equipment 230 may easily obtained through, for example, global positioning system (GPS) (such as in case of a smartphone), plain old telephone service (POTS) (such as in case of a landline phone), and further through integrated services digital network (ISDN), internet protocol (IP) in case of a computing device using one of the communication services (e.g., Skype) through voice over IP (VoIP), etc.

In one embodiment, since the call may be simultaneously received at call control mechanism 110 and call management center 240 where it is answered by a call operator, much of the information may obtained by simply asking the caller a few predetermined (that may be pre-recorded) questions, such as the caller address, location/address of emergency, type/nature of emergency (e.g., police, fire, medical, etc.) and its seriousness or risk level (neighborhood fire, heart attack, death, turning blue, not breathing, intruder in the house, person with a gun, no response, etc.). Once one or more of these factors (such as voice recognition, location-based services, online mapping service, and caller subscriber information, etc., as described above) have been determined, a value or a number may be assigned to potentially guide the operator to handle the call, accordingly, while the call may be placed in appropriate queue by queue placement logic 210.

In one embodiment, call scanning logic 206 may be used to scan other calls received from, for example, the same or nearby location to determine whether the emergency might be collective, such as neighborhood fire, mass shooting, etc. Call evaluation logic 204 may use the information obtained through scanning of other calls to correlate multiple calls to determine the emergency to be a collective emergency or the same emergency and recommend assigning a note and/or a priority level so the call may be processed accordingly. For example and in one embodiment, call evaluation logic 204 may recommend assigning a note or a message (e.g., "multiple calls have reported a fire at 555 Main Street", etc.) for the operator to read and act on, while another message (e.g., "if this is regarding the fire at 555 Main Street, please stay on the line and an operator will assist your shortly", etc.) may be recorded for any potential callers reporting the same fire. Priority assigning logic 208 may associate any recommended notes to the call and further assign a value (e.g., a number (such 1, 5, 25, etc.), a priority level (such as first priority, third priority, etc.), a risk percentage (such as 99%, 75%, 10% etc.), a severity level (such as very high or red, high or orange, very low or blue, etc.) to the call and forwarded it on to queue placement logic 210 that then places the call and any other relevant calls in an appropriate queue to be processed by one or more call operators.

In some embodiments, based on the data evaluated by call evaluation logic 204 a report may be generated and provided as part of the ERS call and made available to the operators to serve as a reference that can be used when processing the call. As aforementioned, voice messages specific to a particular emergency may be generated and broadcast to other pertinent callers (calling regarding the same emergency). In one embodiment, call evaluation logic 204 may also include translation capabilities to instantly translate the call from one language to another. For example, a call in French can be instantly translated into English and, similarly, any dialogue taken place between the caller and the operator may be translated and copies in two or more languages (e.g., French, Spanish and English) may be maintained for reference and other relevant purposes.

It is contemplated that any number and type of components may be added to and/or removed from dynamic call control mechanism 110 to facilitate various embodiments including adding, removing, and/or enhancing certain features. For brevity, clarity, and ease of understanding of call control mechanism 110, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

FIG. 2B illustrates a call log 250 listing and prioritizing a number of received and evaluated calls 252, 254, 256 according to one embodiment. In one embodiment, a call log 250 may be generated or populated using a number of aforementioned factors, such as voice recognition of the caller, language the user used (e.g., Spanish, Urdu, etc.), keywords and phrases (e.g., "stranger in my house", "not breathing", etc.), geographic location of the caller and/or emergency using mapping information (e.g., identifying the bank where the robbery is in progress, neighborhood fire, etc.), and the like. In the illustrated embodiment, call log 250 list three calls 252, 254, 256 that are categorized by various associated factors, such as date/time 258 of each call, an identification number 260 that is assigned to each call, type of emergency 262 (e.g., medical, fire, police) of each call, percentage of risk (or severity level) 264 assigned to each emergency/call, call details 266, name of person calling 268, address 270, and the like. For example, with regard to call 252, the nature of emergency 262 may be regarded as a medical emergency without a caller response (see call details 266) and therefore, call 252 may be assigned a risk level of 99% since without the response, the person may be regarded as dead or dying. Similarly, other calls 254, 256 are assigned risk percentages 264 and put in a corresponding queue for processing. Using this log, an operator may handle call 252 (assigned 99% risk level)

before call 254 (assigned 98% risk level) and thereafter, handle call 256 (assigned 50% risk level).

Figure 3:
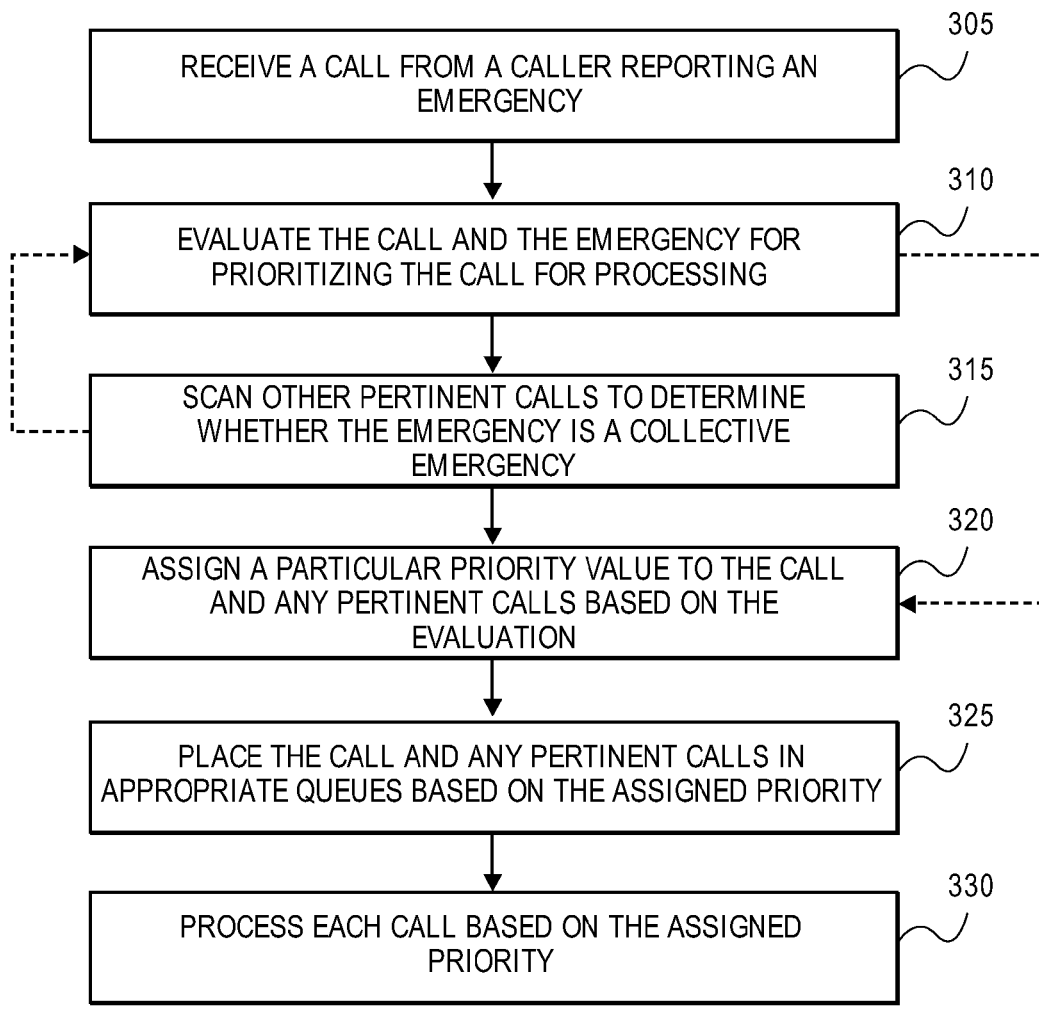
FIG. 3 illustrates a method for facilitating dynamically prioritized control of calls over a network according to one embodiment.

FIG. 3 illustrates a method for facilitating dynamically prioritized control of calls over a network according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by dynamic call control mechanism 110 of FIG. 1.

Method 300 begins at block 305 with receiving a call from a caller reporting an emergency. At block 310, the received call and the emergency is evaluated for prioritizing the call for call operators. At block 315, an optional scanning of other pertinent calls may be performed to determine whether the same emergency has been reported by other callers. If yes, the emergency may be regarded as a collective emergency. If not, the emergency may be regarded as an individual emergency. Either way, at block 320, the call is assigned a particular value (e.g., a number, a priority level, a risk percentage, a severity level, etc.) based on the evaluation of the emergency. Similarly, other calls (such as any calls pertinent to the same emergency) may also be assigned a value. The scanning process may be optional and skipped as indicated by the dotted arrow leading from block 310 to block 320. Further, in some embodiment, upon scanning of other pertinent calls at block 315, the process may revert back to block 310 for evaluation of the scanned pertinent calls. At block 325, the call and any other relevant calls are placed in an appropriate queue based on their assigned priority level for processing. At block 330, each call is processed by a call operator based on the assigned priority.

Figure 4:
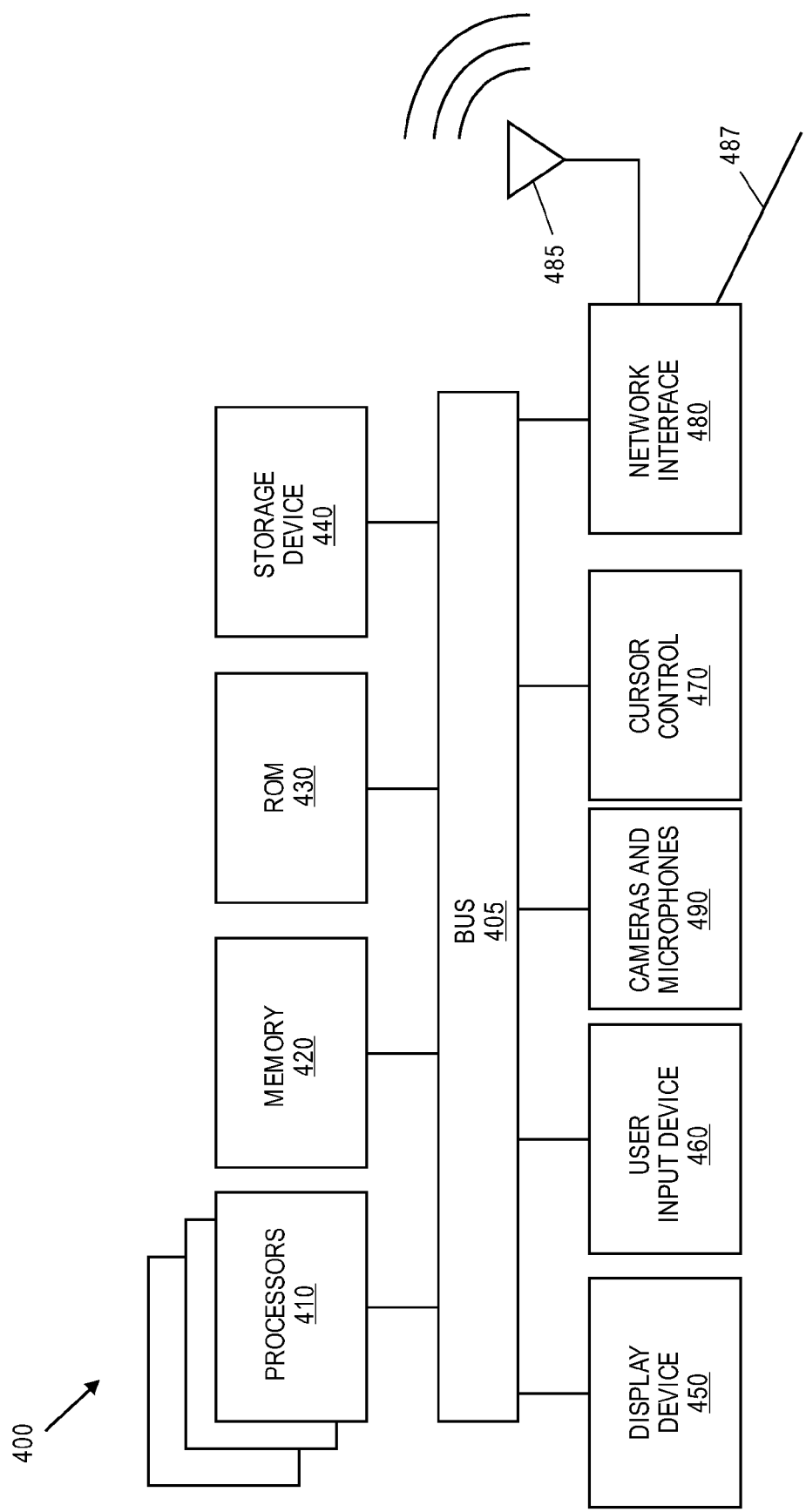
FIG. 4 illustrates computer system suitable for implementing embodiments of the present disclosure according to one embodiment.

FIG. 4 illustrates an embodiment of a computing system 400. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components.

Computing system 400 includes bus 405 (or a link, an interconnect, or another type of communication device or interface to communicate information) and processor 410 coupled to bus 405 that may process information. While computing system 400 is illustrated with a single processor, electronic system 400 and may include multiple processors and/or co-processors, such as one or more of central processors, graphics processors, and physics processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, or cursor direction keys to communicate direction information and command selections to processor 410 and to control cursor movement on display 450. Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may including one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments, as described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Some embodiments pertain to a method comprising: receiving, at a computing device, a call reporting an emergency; evaluating the received call and the reported emergency; assigning a priority level call based on the evaluation of the call and the emergency; placing the call in a first queue based on the assigned priority level, wherein the call is picked from the first queue and processed based on the assigned priority level.

Embodiments or examples include any of the above methods further comprising: scanning a plurality of calls for one or more of the plurality of calls that are pertinent to the received call; and re-evaluating the call and the emergency based on the one or more pertinent calls.

Embodiments or examples include any of the above methods further comprising reassigning a priority level based on the re-evaluation of the call and the emergency.

Embodiments or examples include any of the above methods further comprising replacing the call in a second queue based on the re-assigned priority level, wherein the call is picked from the second queue and processed based on the re-assigned priority level.

Embodiments or examples include any of the above methods wherein the call is placed by a call placement equipment including one or more of a landline telephone or a computing device having a mobile computing device including one or more of a smartphone, a personal digital assistant (PDA), a tablet computer, a laptop computer, a desktop computer.

Embodiments or examples include any of the above methods wherein the call is processed at a call management center having an emergency response service (ERS) and a plurality of call operators.

Embodiments or examples include any of the above methods wherein the priority assignment logic is further to generate a call log and populating the call log based on one or more of voice recognition of a caller of the call, language used by the caller to communicate, keywords or phrases uttered by the caller, and geographic location of the caller or the emergency as determined using location or mapping services.

Another embodiment or example includes an apparatus performing any of the methods in the examples above.

In another embodiment or example, an apparatus comprises: call reception logic to receive a call reporting an emergency; call evaluation logic to evaluate the received call and the reported emergency; priority assignment logic to assign a priority level to the call based on the evaluation of the call and the emergency; and queue placement logic to place the call in a first queue based on the assigned priority level, wherein the call is picked from the first queue and processed based on the assigned priority level.

Embodiments or examples include the apparatus above further comprising: call scanning logic to scan a plurality of calls for one or more of the plurality of calls that are pertinent to the received call; and the call evaluation logic to re-evaluate the call and the emergency based on the one or more pertinent calls.

Embodiments or examples include the apparatus above wherein the priority assignment logic is further to reassign a priority level based on the re-evaluation of the call and the emergency.

Embodiments or examples include the apparatus above wherein the queue placement logic is further to re-place the call in a second queue based on the re-assigned priority level, wherein the call is picked from the second queue and processed based on the re-assigned priority level.

Embodiments or examples include the apparatus above wherein the call is placed by a call placement equipment including one or more of a landline telephone or a computing device having a mobile computing device including one or more of a smartphone, a personal digital assistant (PDA), a tablet computer, a laptop computer, a desktop computer.

Embodiments or examples include the apparatus above wherein the call is processed at a call management center having an emergency response service (ERS) and a plurality of call operators.

Embodiments or examples include the apparatus above wherein the priority assignment logic is further to generate a call log and populating the call log based on one or more of voice recognition of a caller of the call, language used by the caller to communicate, keywords or phrases uttered by the caller, and geographic location of the caller or the emergency as determined using location or mapping services.

In another embodiment or example, a system comprises: a computing device having a memory to store instructions, and a processing device to execute the instructions, the computing device further having a mechanism to: receive, via a call reception logic, a call reporting an emergency; evaluate, via call evaluation logic, the received call and the reported emergency; assign, via priority assignment logic, a priority level to the call based on the evaluation of the call and the emergency; and place, via queue placement logic, the call in a first queue based on the assigned priority level, wherein the call is picked from the first queue and processed based on the assigned priority level.

Embodiments or examples include the system above wherein the mechanism is further to: scan, via call scanning logic, a plurality of calls for one or more of the plurality of calls that are pertinent to the received call, wherein the call evaluation logic is further to re-evaluate the call and the emergency based on the one or more pertinent calls.

Embodiments or examples include the system above wherein the mechanism is further to reassign a priority level based on the re-evaluation of the call and the emergency.

Embodiments or examples include the system above wherein the mechanism is further to re-place the call in a second queue based on the re-assigned priority level, wherein the call is picked from the second queue and processed based on the re-assigned priority level.

Embodiments or examples include the system above wherein the call is placed by a call placement equipment including one or more of a landline telephone or a computing device having a mobile computing device including one or more of a smartphone, a personal digital assistant (PDA), a tablet computer, a laptop computer, a desktop computer.

Embodiments or examples include the system above wherein the call is processed at a call management center having an emergency response service (ERS) and a plurality of call operators.

Embodiments or examples include the system above wherein the priority assignment logic is further to generate a call log and populating the call log based on one or more of voice recognition of a caller of the call, language used by the caller to communicate, keywords or phrases uttered by the caller, and geographic location of the caller or the emergency as determined using location or mapping services.

In another embodiment or example, an apparatus comprises means for performing any one or more of the operations mentioned above.

In yet another embodiment or example, at least one machine-readable storage medium comprising a plurality of instructions that in response to being executed on a computing device, causes the computing device to carry out a method according to any one or more of the operations mentioned above.

In yet another embodiment or example, at least one non-transitory or tangible machine-readable storage medium comprising a plurality of instructions that in response to being executed on a computing device, causes the computing device to carry out a method according to any one or more of the operations mentioned above.

In yet another embodiment or example, a computing device arranged to perform a method according to any one or more of the operations mentioned above.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
    call reception logic, at least a portion of which is implemented in hardware, to receive a call reporting an emergency;
    call evaluation logic, at least a portion of which is implemented in hardware, to automatically evaluate the received call, wherein the automatic evaluation is based on caller subscriber information;
    priority assignment logic, at least a portion of which is implemented in hardware, to assign a priority level to the call based on the evaluation of the call, wherein the evaluation includes determining a type of the emergency and assigning the priority level to the call based on the type of the emergency, wherein the priority level is further assigned based on one or more risk percentages as determined from the evaluation of the call;
    queue placement logic, at least a portion of which is implemented in hardware, to place the call in a first queue based on the assigned priority level, wherein the call is picked from the first queue and processed based on the assigned priority level, wherein the queue placement logic is further to re-place the call in a second queue based on a re-assigned priority level, wherein the call is picked from the second queue and processed based on the re-assigned priority level; and
    call scanning logic, at least a portion of which is implemented in hardware, to scan a plurality of calls for one or more of the plurality of calls that are pertinent to the received call, wherein the received call and the one or more of the plurality of calls are correlated to determine the emergency to be a collective emergency,
    wherein the call evaluation logic is further configured to re-evaluate the call based on the one or more pertinent calls, wherein the re-evaluation of the call includes re-determining the type of the emergency, and
    wherein the reassigned priority level is based on the re-evaluation of the call, wherein the automatic evaluation is further based on digital voice recognition, location-based services, and online mapping services.

2. The apparatus of claim 1, wherein the call is received at the computing device via a call placement equipment including one or more of a landline telephone or a computing device having a mobile computing device including one or more of a smartphone, a personal digital assistant (PDA), a tablet computer, a laptop computer, a desktop computer.

3. The apparatus of claim 1, wherein the call is processed at a call management center having an emergency response service (ERS) and a plurality of call operators.

4. The apparatus of claim 1, wherein the type of the emergency is further determined based on one or more of language used by the caller, keywords or phrases uttered by the caller, and geographic location of the caller or the emergency as determined using the location-based services or the online mapping services, wherein the priority assignment logic is further to generate a call log and populate the call log based on the evaluation of the call.

5. At least one non-transitory machine-readable storage medium comprising a plurality of instructions that in response to being executed on a computing device, causes the computing device to carry out a method according to one or more operations comprising:

receiving, at a computing device, a call reporting an emergency;

automatically evaluating the received call, wherein the automatic evaluation is based on caller subscriber information;

assigning a priority level to the call based on the evaluation of the call, wherein the evaluation includes determining a type of the emergency and assigning the priority level to the call based on the type of the emergency, wherein the priority level is further assigned based on one or more risk percentages as determined from the evaluation of the call;

placing the call in a first queue based on the assigned priority level, wherein the call is picked from the first queue and processed based on the assigned priority level, wherein the queue placement logic is further to re-place the call in a second queue based on a re-assigned priority level, wherein the call is picked from the second queue and processed based on the re-assigned priority level; and scanning a plurality of calls for one or more of the plurality of calls that are pertinent to the received call, wherein the received call and the one or more of the plurality of calls are correlated to determine the emergency to be a collective emergency, wherein automatically evaluating includes automatically re-evaluating the call based on the one or more pertinent calls, wherein the re-evaluation of the call includes re-determining the type of the emergency, and wherein the reassigned priority level is based on the re-evaluation of the call, wherein the automatic evaluation is further based on digital voice recognition, location-based services, and online mapping services.

6. The non-transitory machine-readable storage medium of claim 5, wherein the call is placed by a call placement equipment including one or more of a landline telephone or a computing device having a mobile computing device including one or more of a smartphone, a personal digital assistant (PDA), a tablet computer, a laptop computer, a desktop computer.

7. The non-transitory machine-readable storage medium of claim 5, wherein the call is processed at a call management center having an emergency response service (ERS) and a plurality of call operators.

8. The non-transitory machine-readable storage medium of claim 5, wherein the type of the emergency is further determined based on one or more of language used by the caller, keywords or phrases uttered by the caller, and geographic location of the caller or the emergency as determined using the location-based services or the online mapping services, wherein the priority assignment logic is further to generate a call log and populate the call log based on the evaluation of the call.

9. A method comprising:

receiving, at a computing device, a call reporting an emergency;

automatically evaluating the received call, wherein the automatic evaluation is based on caller subscriber information;

assigning a priority level to the call based on the evaluation of the call, wherein the evaluation includes determining a type of the emergency and assigning the priority level to the call based on the type of the emergency, wherein the priority level is further assigned based on one or more risk percentages as determined from the evaluation of the call;

placing the call in a first queue based on the assigned priority level, wherein the call is picked from the first queue and processed based on the assigned priority level, wherein the queue placement logic is further to re-place the call in a second queue based on a re-assigned priority level, wherein the call is picked from the second queue and processed based on the re-assigned priority level; and scanning a plurality of calls for one or more of the plurality of calls that are pertinent to the received call, wherein the received call and the one or more of the plurality of calls are correlated to determine the emergency to be a collective emergency, wherein automatically evaluating includes automatically re-evaluating the call based on the one or more pertinent calls, wherein the re-evaluation of the call includes re-determining the type of the emergency, and wherein the reassigned priority level is based on the re-evaluation of the call, wherein the automatic evaluation is further based on digital voice recognition, location-based services, and online mapping services.

10. The method of claim 9, wherein the call is received at the computing device via a call placement equipment including one or more of a landline telephone or a computing device having a mobile computing device including one or more of a smartphone, a personal digital assistant (PDA), a tablet computer, a laptop computer, a desktop computer.

11. The method of claim 9, wherein the call is processed at a call management center having an emergency response service (ERS) and a plurality of call operators.

* * * * *